(12) United States Patent
DePadro

(10) Patent No.: US 10,035,529 B2
(45) Date of Patent: Jul. 31, 2018

(54) CART WITH LIFTING ASSISTANCE

(71) Applicant: James Anthony DePadro, Cumming, GA (US)

(72) Inventor: James Anthony DePadro, Cumming, GA (US)

(*) Notice: Subject to any disclaimer, the term of this patent is extended or adjusted under 35 U.S.C. 154(b) by 90 days.

(21) Appl. No.: 15/171,003

(22) Filed: Jun. 2, 2016

(65) Prior Publication Data

US 2017/0349198 A1    Dec. 7, 2017

(51) Int. Cl.
  *B62B 3/04*    (2006.01)
  *B62B 3/10*    (2006.01)
  *B62B 3/02*    (2006.01)
  *B62B 5/00*    (2006.01)
  *B62B 3/06*    (2006.01)

(52) U.S. Cl.
  CPC .............. *B62B 3/104* (2013.01); *B62B 3/02* (2013.01); *B62B 3/0612* (2013.01); *B62B 5/0033* (2013.01); *B62B 5/0069* (2013.01); *B62B 2202/20* (2013.01)

(58) Field of Classification Search
  CPC ... B62B 3/0612; B62B 3/104; B62B 2202/20; B62B 2203/40; B62B 2206/003
  USPC .......................... 414/453–456, 490
  See application file for complete search history.

(56) References Cited

U.S. PATENT DOCUMENTS

| | | | | |
|---|---|---|---|---|
| 725,828 A | * | 4/1903 | Davis, Jr. ............. | B62B 1/264 414/456 |
| 2,461,203 A | * | 2/1949 | Evans .................. | B62B 1/145 280/47.34 |
| 2,663,440 A | * | 12/1953 | Jackson ................ | B62B 1/264 180/19.1 |
| 3,208,614 A | * | 9/1965 | Armitage .............. | B62B 1/264 280/47.24 |
| 3,358,863 A | * | 12/1967 | Griffith ............... | B62B 1/264 294/187 |
| 3,376,986 A | * | 4/1968 | Farber ................. | B62B 1/14 414/446 |
| 4,281,957 A | * | 8/1981 | Vishe .................. | F41A 9/87 414/457 |

(Continued)

FOREIGN PATENT DOCUMENTS

| | | | | |
|---|---|---|---|---|
| EP | 2192021 A2 | * | 6/2010 | ........... B62B 3/0612 |
| JP | 05254442 A | * | 10/1993 | |

(Continued)

*Primary Examiner* — James Keenan
(74) *Attorney, Agent, or Firm* — Dunlap Bennett & Ludwig PLLC

(57) ABSTRACT

A cart with lifting assistance is provided. The cart includes a forward frame having a top end and a bottom end. The forward frame makes up a front end of the cart. The cart further includes a rearward frame having a top end and a bottom end. The rearward frame makes up a rear end of the cart. Wheels are secured to the bottom ends of the forward frame and the rearward frame. A handle frame extends from at least one of the top ends of the forward frame and the rearward frame, and disposed towards the rear end around a waist height of a user. A pivoting frame is pivotally connected to the front end of the cart and pivots from the front end to beyond the front end. A latch is secured to the pivoting frame and is operable to releasably connect to a bin or container.

9 Claims, 4 Drawing Sheets

(56) References Cited

U.S. PATENT DOCUMENTS

| | | | |
|---|---|---|---|
| 7,018,155 B1* | 3/2006 | Heberling | B62B 3/0606 |
| | | | 414/408 |
| 7,886,853 B2 | 2/2011 | Konopa | |
| 8,186,931 B2* | 5/2012 | Borntrager | B66F 9/065 |
| | | | 187/231 |
| 8,596,389 B2 | 12/2013 | Anasiewicz | |
| 8,695,736 B1* | 4/2014 | Samaroo | B65F 1/1452 |
| | | | 180/11 |
| 2004/0253086 A1* | 12/2004 | Dixon | B62B 1/12 |
| | | | 414/490 |
| 2005/0281653 A1 | 12/2005 | Channel | |
| 2015/0123059 A1* | 5/2015 | West | B62B 3/0612 |
| | | | 254/9 R |
| 2015/0203137 A1* | 7/2015 | Lang | B62B 3/04 |
| | | | 414/469 |

FOREIGN PATENT DOCUMENTS

| | | | | |
|---|---|---|---|---|
| JP | 06056396 A | * | 3/1994 | |
| WO | WO-009213745 A2 | * | 8/1992 | B62B 1/14 |
| WO | WO-2010091460 A1 | * | 8/2010 | B62B 3/02 |

\* cited by examiner

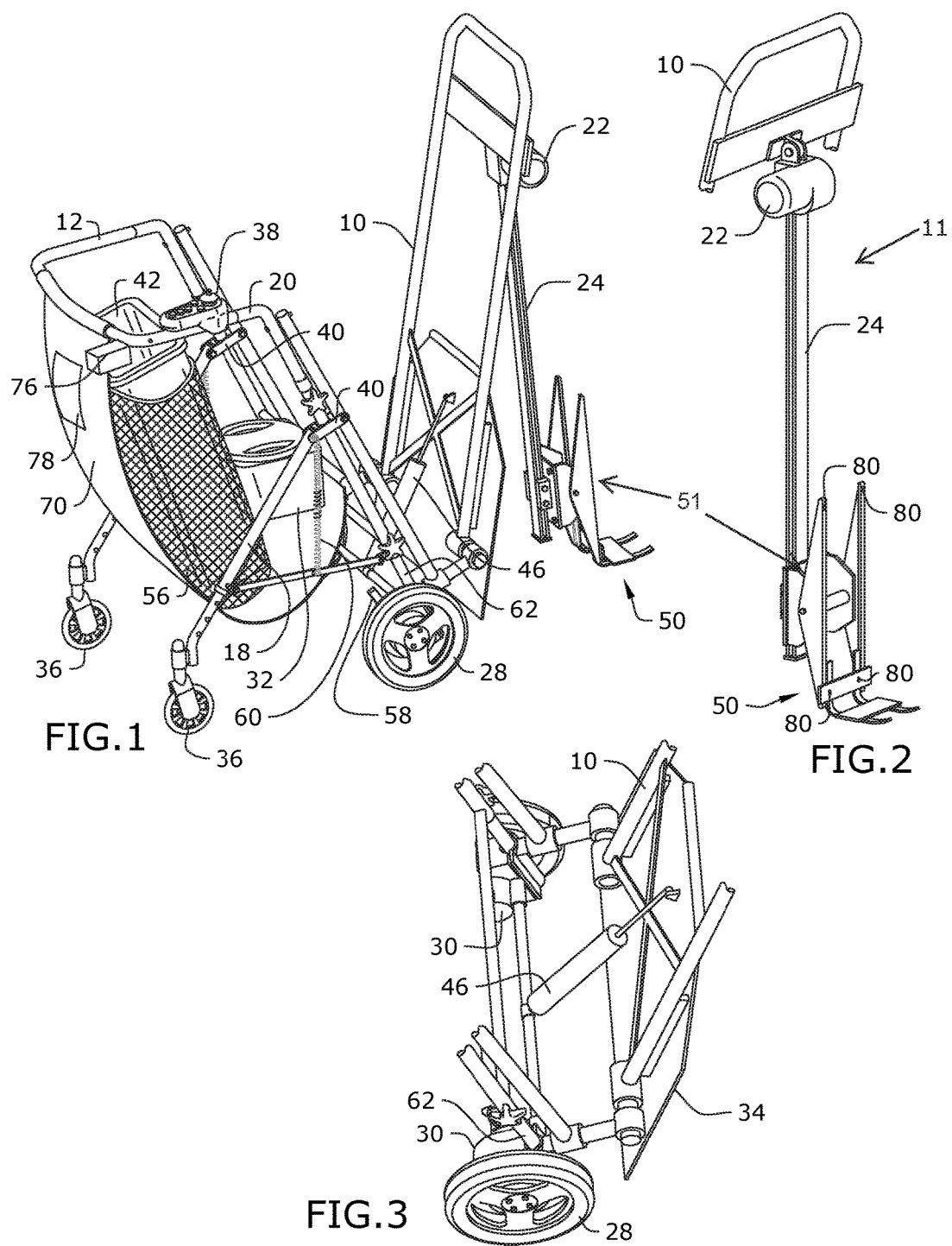

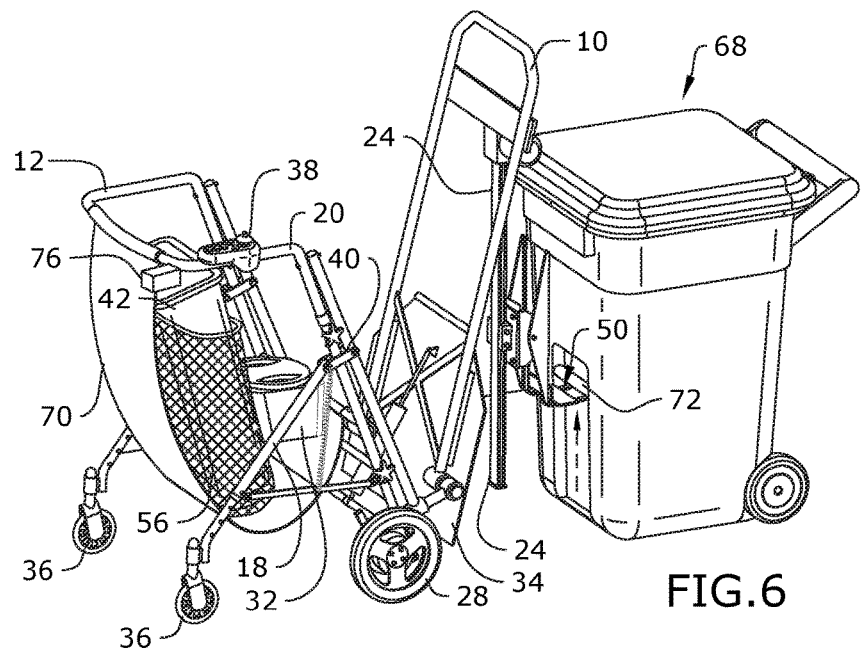
FIG.6
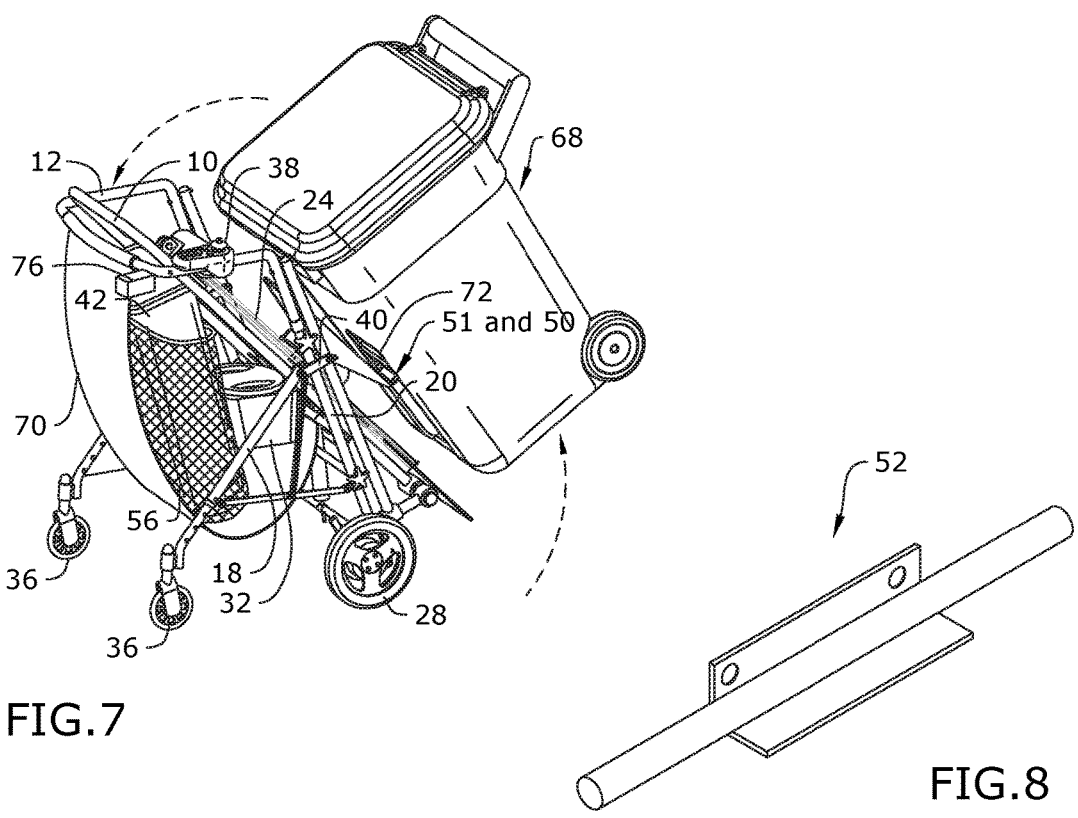
FIG.7
FIG.8

CART WITH LIFTING ASSISTANCE

BACKGROUND OF THE INVENTION

The present invention relates to a cart and, more particularly, to a cart with lifting assistance.

An aging population with physical disabilities, growing single family households, and high divorce rates makes completing domestic household tasks, such as moving bulky objects and sanity containers, more difficult to complete.

As can be seen, there is a need for an automated cart with lifting assistance to aid the elderly and disabled.

SUMMARY OF THE INVENTION

In one aspect of the present invention, a cart comprises: a forward frame comprising a top end and a bottom end, wherein the forward frame forms a front end of the cart; a rearward frame comprising a top end and a bottom end, wherein the rearward frame forms a rear end of the cart; a plurality of wheels secured to the bottom ends of the forward frame and the rearward frame; a handle frame extending from at least one of the forward frame and the rearward frame, and disposed towards the rear end around a waist height of a user, comparable to a walker; a pivoting frame pivotally connected and operable to pivot beyond the front end; and a lift arm, mount frame and latch secured to the pivoting frame and operable to releasably connect to a bin or container.

These and other features, aspects and advantages of the present invention will become better understood with reference to the following drawings, description and claims.

BRIEF DESCRIPTION OF THE DRAWINGS

FIG. 1 is a perspective view of an embodiment of the present invention;

FIG. 2 is a detail perspective view of a motorized lift arm, mount frame and a latching member of an embodiment of the present invention;

FIG. 3 is a perspective detail view of a pivoting frame pivotally connected with a forward frame of an embodiment of the present invention;

FIG. 6 is a perspective view of an embodiment of the present invention in a tertiary configuration;

FIG. 7 is a perspective view of an embodiment of the present invention in a quaternary configuration;

FIG. 8 is a detail perspective view of a latching member of an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an automated electric dolly/cart for moving various size containers, through various terrains and weather, exemplified by refuse containers. The present invention uses electric motors with traction wheels on a special foldable frame with attachments; automated robotic controls configured in a device to speed the handling of various sized containers over difficult terrain with minimal physical effort.

The present invention folds into a convenient size for storage. The present invention also has attachments to handle containers of different shape and size. No special containers are needed. For waste containers, sanitary companies will not need to change their equipment. In addition, different traction or wheel options can address poor weather conditions and obstacles to allow container movement.

Figure 4:
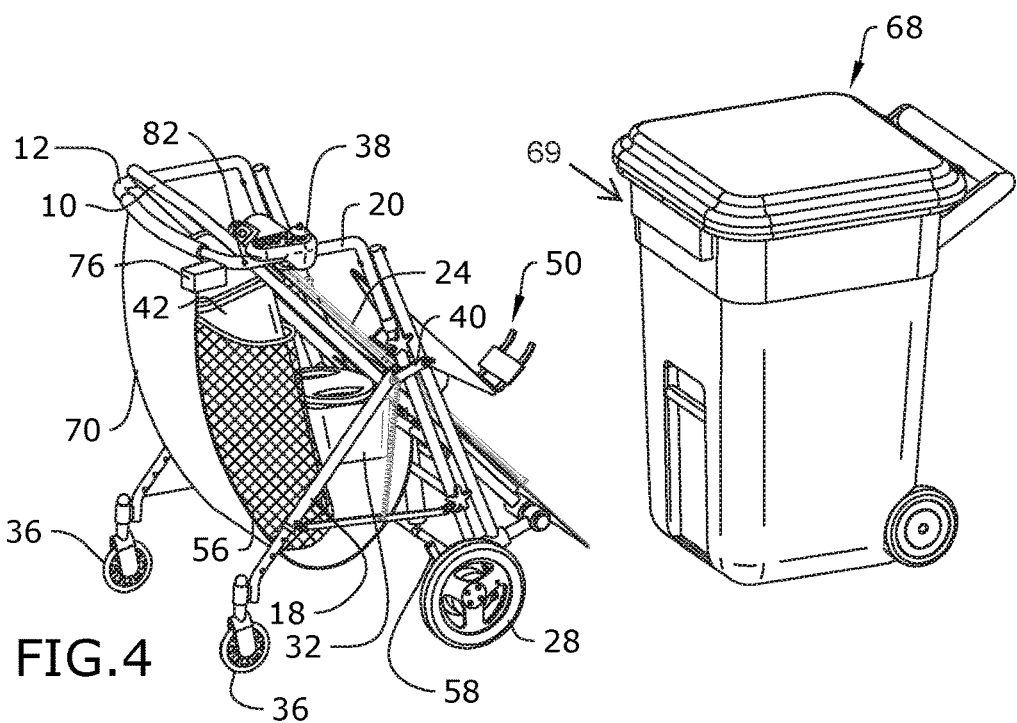
FIG. 4 is a perspective view of an embodiment of the present invention in an initial configuration.
Figure 5:
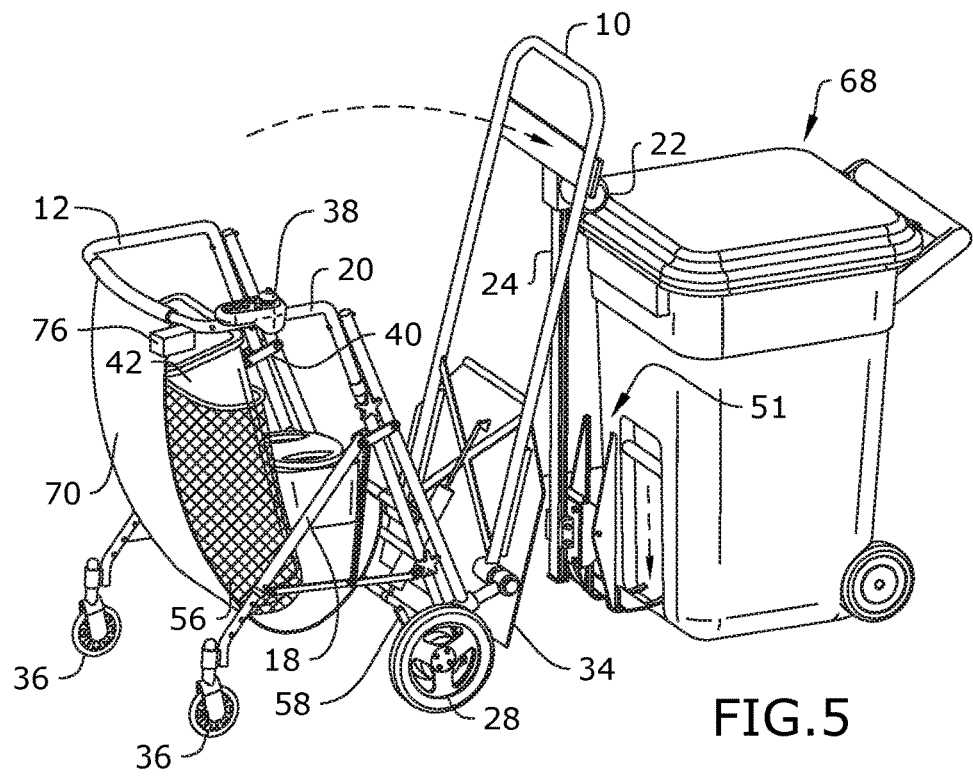
FIG. 5 is a perspective view of an embodiment of the present invention in a secondary configuration.
Figure 9:
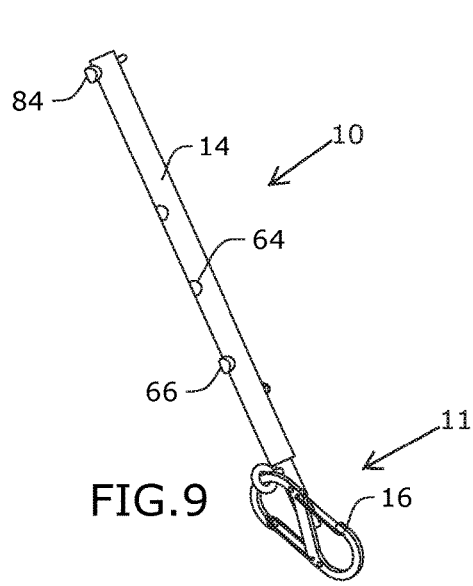
FIG. 9 is a detail perspective view of a manual lift arm, telescoping tube, and a latching member of an embodiment of the present invention.
Figure 10:
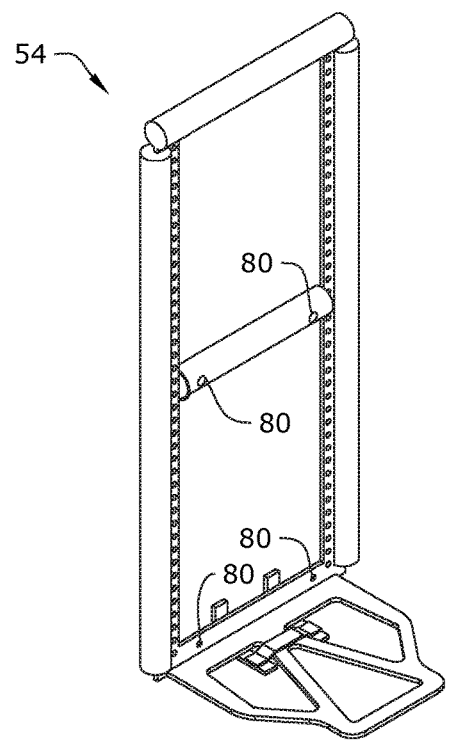
FIG. 10 is a detail perspective view of a latching member of an embodiment of the present invention.
Figure 11:
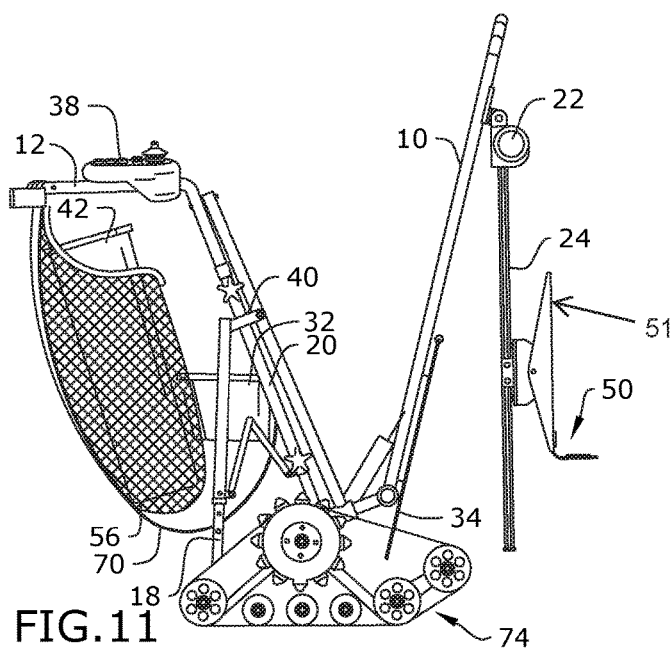
FIG. 11 is a side view of an embodiment of the present invention.
Figure 12:
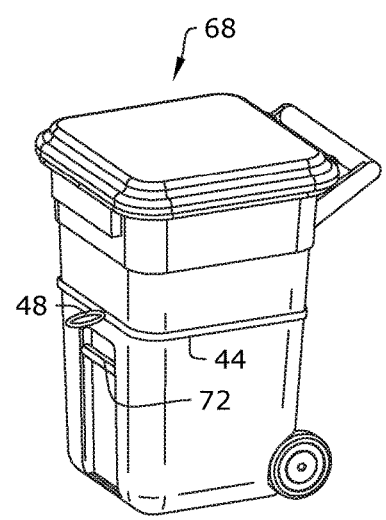
FIG. 12 is a perspective view of a strap component of an embodiment of the present invention.

Referring to FIGS. 1 through 12, the present invention includes a cart. The cart includes a main frame 18, 20. The main frame 18, 20 includes a forward frame 20 and a rearward frame 18. The forward frame 20 includes a top end and a bottom end and makes up a front end of the cart. The rearward frame 18 has a top end and a bottom end and makes up a rear end of the cart. A plurality of wheels 28, 36 are secured to the bottom ends of the forward frame 20 and the rearward frame 18. A handle frame 12 extends from at least one of the top ends of the forward frame 20 and the rearward frame 18, and is disposed towards the rear end around a waist height of a user. A pivoting frame 10 is pivotally connected to the cart and pivots from the front end to beyond the front end. A latch 11 is secured to the pivoting frame 10 and is operable to releasably connect to a bin 68.

The forward frame 20 may include two forward legs, each having a wheel 28 attached to the bottom end. The rearward frame 18 may also include two rearward legs, each having a swivel or powered wheels 36 secured to the bottom end. The forward frame 20 and the rearward frame 18 legs may be telescoping shafts 62 for adjusting the height of the cart. In certain embodiments, the rearward frame 18 may be compressed towards the forward frame 20. In such embodiments, a top end of the rearward frame 18 is secured to the forward frame 20 by a hinge 40. The forward frame 20 and a rearward frame 18 may also be connected by a pivoting shaft and spring 60 that assists the frames 18, 20 in pivoting together.

The pivoting frame 10 of the present invention may include a bottom end pivotally secured near the bottom end of the forward frame 20. In certain embodiments, the pivoting frame 10 may be motorized. In such embodiments, a motor controller 32 and a first motor or damper 46 may be utilized. An end of the first motor 46 or damper is secured to the pivoting frame 10 and a second end of the first motor 46 or damper is secured to the front end of the cart. The motor controller 32 is operatively connected to the first motor 46, and the first motor 46 or damper pivots the pivoting frame 10 forward away from the front end and backward towards the front end via the motor controller 32 or damper.

The present invention may further utilize a motorized latch 11. In such embodiments, an elongated motor track 24 may be pivotally secured to a top end of the pivoting frame 10. A latching member 50 may be slidably engaged with the motor track 24. A stop plate 34 may be secured to a front surface of the pivoting frame 10 so that the motor track 24 and the latching member 50 may rest against it during transportation of the bin 68. A second motor 22 may be operatively connected with the latching member 50 and may move the latching member 50 from the bottom end to the top end and the top end to the bottom end of the motor track 24. Using the motorized latch 11 and pivoting frame 10, the pivoting frame 10 may be pivoted away from the front end towards a bin 68. The latching member 50 may connect to the bin bar 72 of the bin 68 and the latching member 50 may slide upward along the motor track 24, thereby lifting the bin 68. The pivoting frame 10 may pivot back towards the front end of the cart and the bin 68 may be transported. The latch member 50 may include screw holes 80 for connecting the latch member 50 to the motorized latch 11 via screws. The latch member may be in different forms, such as a dolly style latch member 54 and an L-shaped latch member 52.

In certain embodiments, the present invention may use a manual latch 10 composed of a manual lift arm, telescoping tube and a latch member. For example, latch 10 may include a telescoping tube 14 secured to pivot frame 10 by a pivot pin 84. The telescoping tube 14 may include a closure assist spring 66 that fits through aligned lock holes 64 to extend the tubes length 11. In such embodiments, a user may pivot the telescoping tube 14 away from the front end of the cart. The bin 68 may include a strap 44 and a ring 48. The latch 10 may include a hook 16 latch member, such as a carbineer. The hook 16 may secure to the ring 48, thereby attaching the bin 68 to the cart.

The wheels 28 of the present invention may include a brake latch 58 and EMB brake, locking the wheels 28 in place, when not in use or when loading the bin 68. In certain embodiments, the wheels 28 of the present invention may be motorized. For example, third motors 30 may be operatively connected to the wheels 28 through a motor controller 32. Therefore, if the bin 68 is full and heavy, the motorized wheels 28 may assist the user in transporting the bin 68. The wheels 28 may also include a self-balancing mechanism, in which only two wheels or one wheel is needed. The present invention may also be built for all terrain travel. In such embodiments, the wheels 28, 36 may be in the form of gears and sprockets. An endless track may surround the wheels 28, 36 forming an all-terrain track 74. Therefore, the present invention may be used in grass, mud, snow, steep hills and other adverse terrain.

A battery is stored in the same compartment as motor controller 32 and may be used to power the motors 22, 30, 46 and at least one operational controller 38, 76 may be used to control the motors 22, 30, 46. The at least one operational controller 38, 76 may include a first controller 38 and a second controller 76. Additional controllers may be needed or all unified into one controller. The first controller 38 may be operatively connected to the third motors 30 and may be used to control the operation and speed of the wheels 28. The second controller 76 may be operatively connected to the second motor 22 or first motor 46, as needed. The second controller 76 may be used to operate the movement of the pivoting frame 10 and the movement of the latch 11.

In certain embodiments, a bag or container may be secured to the frames 12, 18, 20. The bag may include a netting 56 and a fabric 70. The bag may further include a pocket 78 to store additional items. The bag may be disposed in between the forward frame 20, the rearward frame 18 and the handle frame 12. A user may place a household bin 42 within the bag.

The present invention may further include sensors to accurately position the lift arm and manipulator to connect the latch 11 to the bin 68. Other sensors may provide torque control with level sensing, collision detection avoidance, operator follower option, remote radio/smart phone control operation, and route learning options.

It should be understood, of course, that the foregoing relates to exemplary embodiments of the invention and that modifications may be made without departing from the spirit and scope of the invention as set forth in the following claims.

What is claimed is:

1. A cart comprising:
    a main frame comprising a top end, a bottom end, a front end and a rear end;
    a plurality of wheels secured to the bottom end of the main frame;
    a handle frame extending from the main frame, and disposed towards the rear end around a waist height of a user;
    a pivoting frame pivotally connected to the main frame and operable to pivot beyond the front end;
    a first motor operable to pivot the pivoting frame forward away from the front end and backward towards the front end;
    a motor track vertically disposed and comprising a top end and a bottom end, wherein the top end of the motor track is pivotally secured to the top end of the pivoting frame;
    a latching member slidably engaged with the motor track, and operable to releasably connect to a bin; and
    a second motor operable to move the latching member from the bottom end of the motor track to the top end of the motor track.

2. The cart of claim 1, wherein the main frame comprises a forward frame forming the front end and a rearward frame forming the rear end.

3. The cart of claim 2, wherein the pivoting frame comprises a bottom end pivotally secured to the bottom end of the forward frame.

4. The cart of claim 3, further comprising:
    a damper comprising a first end secured to the pivoting frame and a second end secured to forward frame, wherein
    the damper is operatively connected to the first motor.

5. The cart of claim 2, wherein the rearward frame is pivotally secured to the forward frame.

6. The cart of claim 1, further comprising a controller secured to the handle frame operatively connected to the first motor and the second motor.

7. The cart of claim 6, further comprising a third motor operatively connected to at least one of the plurality of wheels, wherein the controller is operatively connected to the third motor.

8. The cart of claim 7, further comprising an all-terrain track secured about the plurality of wheels.

9. The cart of claim 1, further comprising a bag secured to the rear end of the main frame.

* * * * *